Jan. 9, 1968    R. F. KAYE ET AL    3,362,239

OBLIQUE LAY IDLER WHEEL

Filed Nov. 4, 1965

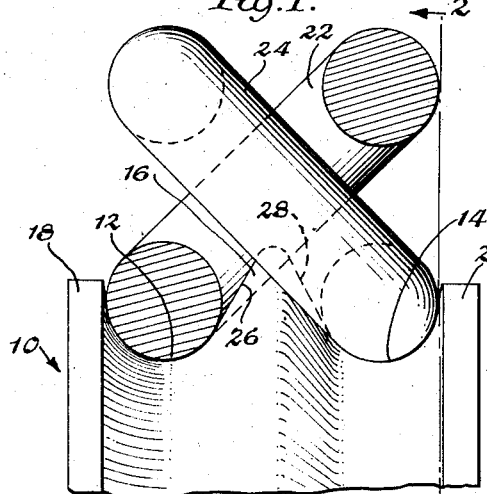

Fig. 1.

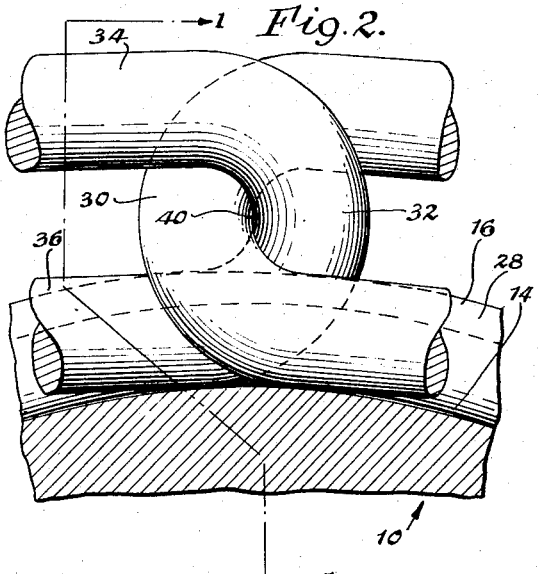

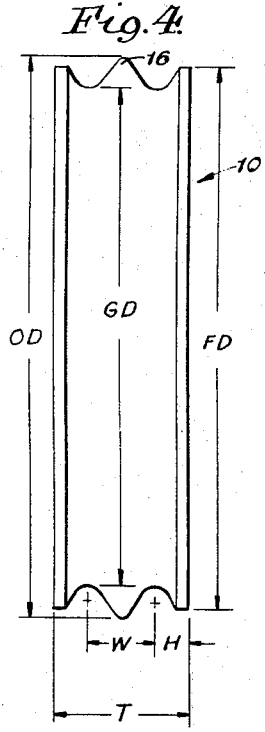

| CHAIN SIZE | PITCH DIA. | CLEARANCE RADIUS | OD | T | FD | H | W | GR | GD | A | FT | FW |
|---|---|---|---|---|---|---|---|---|---|---|---|---|
| IN. | IN. | IN. | IN. | IN. | IN. | IN. | IN. | IN. | IN. | DEGREE | IN. | IN. |
| .406 | $5\frac{35}{64}$ | 3.2 | 4.793 | 1.333 | 4.793 | .403 | .526 | .218 | 4.277 | 37° | $\frac{1}{8}$ | $\frac{1}{8}$ |
| .375 | $5\frac{15}{64}$ | 3.1 | 4.531 | 1.558 | 4.531 | .562 | .562 | .188 | 4.062 | $36\frac{1}{2}°$ | $\frac{1}{4}$ | $\frac{3}{8}$ |
| .312 | $5\frac{1}{16}$ | 3.0 | 4.590 | 1.062 | 4.590 | .301 | .460 | .156 | 4.260 | 39° | $\frac{1}{8}$ | $\frac{1}{8}$ |
| .312 | $3\frac{7}{8}$ | 2.5 | 3.469 | 1.062 | 3.469 | .301 | .460 | .156 | 3.062 | 36° | $\frac{1}{8}$ | $\frac{1}{8}$ |
| .281 | $4\frac{29}{64}$ | 2.6 | 3.875 | .904 | 3.775 | .249 | .406 | .141 | 3.593 | 37° | $\frac{3}{32}$ | $\frac{3}{32}$ |
| .250 | $3\frac{43}{64}$ | 2.3 | 3.319 | .822 | 3.319 | .192 | .438 | .125 | 2.935 | 36° | $\frac{1}{16}$ | $\frac{1}{16}$ |

INVENTORS
RUSSELL F. KAYE
RAYMOND M. ROBINSON
EDWARD R. BEHNKE
FRANZ T. STONE

BY Bean, Brooks, Buckley & Bean
ATTORNEYS

United States Patent Office 3,362,239
Patented Jan. 9, 1968

3,362,239
OBLIQUE LAY IDLER WHEEL
Russell F. Kaye, 77 Mayville Ave., Kenmore, N.Y. 14217, Raymond M. Robinson, 5325 Thompson Road, Clarence, N.Y. 14031, Edward R. Behnke, 3534 Ridge Road, Lockport, N.Y. 14094, and Franz T. Stone, Porterville Road, East Aurora, N.Y. 13026
Filed Nov. 4, 1965, Ser. No. 506,331
5 Claims. (Cl. 74—229)

ABSTRACT OF THE DISCLOSURE

An idler wheel for load chains in which the wheel includes a pair of parallel grooves and an intervening ridge. The load chain is trained over the wheel with alternate links received in one groove and intervening alternate links received in the other groove. The included angle defined by the ridge is substantially less than 90° so as to reduce cyclic loading on the chain incidental to passage of the chain around the idler wheel.

---

This invention relates to idler wheels for hoisting chains and is directed in particular to an improved form of idler wheel which is effective to increase the longevity of a load-bearing chain associated therewith.

Conventional idler wheels for chains employ a wheel having a pair of spaced, parallel grooves in its peripheral surface, with the ridge formed between such grooves being defined by radially outwardly convergent side walls having equal slopes of 45°. This type of construction, that is a 90° ridge construction, has long been accepted as standard in the art. We have found, however, that the angularity of these side walls bears a relation to fatigue of the associated load-bearing chain. Specifically, we have found that if the angularity of the side walls is decreased so that the angle included thereby is somewhat less than 90°, the life of the chain associated therewith may be materially increased. It is well known that a linearly operating chain trained about a sprocket or idler wheel while under tension is subjected to cyclic stresses which will ultimately result in fatigue failure of the chain. The present invention apparently reduces the fatiguing stress during each cycle so that much greater life may be expected for the chain. The increase in life according to the present invention is in the order of 1½ to 2 times that normally expected for hoist chains operating over conventional idler wheels as aforesaid.

More particularly, we have found that if the angle included by the side walls, as aforesaid, is reduced to between about 70° to 80°, substantial improvement in longevity of the chain will be realized. Preferably, this angle is computed in accord with the variables of idler wheel pitch diameter, inside length of the chain link and diameter of the chain link stock, to produce the maximum increase in longevity. The present invention, therefore, is primarily concerned with the provision of an idler wheel for hoist chains in which the ridge between grooves of the wheel includes an angle of between about 70° to about 80° and which preferably is determined by certain dimensional characteristics such as pitch diameter of the idler wheel, chain size (diameter of chain link stock) and inside length of the chain links.

Other objects and advantages of the invention will appear from the specification hereinafter and the accompanying drawing, wherein:

FIG. 1 is an elevational view showing the periphery of an improved idler wheel constructed in accordance with this invention and illustrating a pair of chain links operatively associated therewith;

FIG. 2 is a vertical section taken substantially along the plane of section line 2—2 of FIGURE 1;

FIG. 3 is a view similar to FIGURE 1 but showing merely the profile and identifying certain dimensions of the improved idler wheel;

FIG. 4 is an elevational view of the idler wheel showing further dimensional characteristics; and FIG. 5 is a table showing dimensions and the cone base angle of the ridges of several idler wheels of various pitch diameters and to accommodate various chain sizes, as indicated.

With reference to FIGURE 1, the reference character 10 indicates an idler wheel in general which will be seen to be provided with a pair of parallel circumferentially extending grooves 12 and 14 in spaced, side-by-side relationship around the periphery of the wheel, defining the ridge 16 therebetween. The ridge and the side flanges 18 and 20 which bound the two grooves cooperate to properly guide and locate sequential chain links of an associated load-bearing chain, as indicated by the reference characters 22 and 24 in FIGURE 1. The angle included by the sloping side walls 26 and 28 of the ridge 16 are of paramount interest in connection with the present invention and it will be appreciated that the angularity of these side walls affects the lie of the chain links 22 and 24. As shown in FIGURE 2, the chain link ends 30 and 32 are interengaged and each chain link has an identical pair of ends joined by a pair of barrel portions 34 and 36. The inside dimension of a chain link, designated P hereinafter, is the distance between the inner apices, as at 40 of the two ends of a single chain link and is a dimension which is standardized for each size of welded chain.

Reference to FIGURE 3 will illustrate conventional idler wheel construction wherein the dot-dash lines thereof as indicated by reference characters 42 and 44 represent the conventional ridge side walls which include an angle of 90°. In comparison, according to the present invention, the included angle 2A as shown in FIGURE 3 is somewhat less than 90° and, in particular, lies within the range of between about 70° to about 80°. If this angularity is observed, the load chain associated with the idler wheel will experience greater longevity as compared to a load chain operating with a conventional idler wheel having the side walls 42 and 44 as in FIGURE 3 disposed at 45° slope. It is preferred, however, to construct the idler wheel such that the angle A is in accord with the following equation:

$$A = \pi/4 - \tan^{-1}\frac{d}{p}\sin\frac{2P}{D_1}$$

Where:
$A$ = the ridge slope angle
$d$ = the diameter of the chain link stock (chain size in the table shown in FIG. 5)
$P$ = the inside length of the chain link
$D_1$ = the geometric pitch diameter of the idler wheel By observing the above formulation for the angle A, a maximum increase in longevity of the load chain will be effected, and will represent an increase of about twice the expected life of a load chain operating on a conventional idler wheel mechanism.

It will be appreciated that a load chain, hanging free and supporting a load, will naturally assume the condition in which its successive links lie in mutually perpendicular planes. As a consequence, since the wheel according to the present invention supports successive links to lie in planes including an angle substantially less than 90°, successive links of the load-bearing chain are caused to be relatively rotated as these links engage the present wheel. It is this relative rotation which reduces cyclic loading of the chain caused by articulation between links as the chain changes direction in passing over the wheel.

Whereas only one form of this invention has been illustrated and described in detail hereinabove, it will be understood that various changes may be made therein without departing from the spirit of the invention or the scope of the following claims.

We claim:
1. In a chain power system, in combination, an idler wheel for welded link load chains comprising a cylindrical body having a pair of circumferentially extending parallel grooves defining a ridge therebetween, said ridge having radially outwardly convergent side walls including an angle therebetween which is within the range of about 70° to about 80° and a chain trained over said idler wheel, said chain having alternate links received in one of said grooves and intervening alternate links received in the other of said grooves.

2. The idler wheel as defined in claim 1 wherein the included angle is equal to 2A where:

$$A = \pi/4 - \tan^{-1}\frac{d}{p}\sin\frac{2P}{D_1}$$

where A is in radians; $d$ is the chain stock size; P is the inside length of chain link; and $D_1$ is the geometrical pitch diameter of the idler wheel.

3. In a chain power system, in combination,
a wheel adapted for rotation about its center and having a peripheral chain-supporting surface, said surface being recessed along parallel axially spaced paths extending circumferentially of said wheel to provide side walls defining a ridge therebetween, the side walls of said wheel defining said ridge being outwardly convergent and including an angle substantially less than 90°, and a chain trained over said wheel, said chain having alternate links received in one recess and intervening alternate links received in the other recess.

4. The device as defined in claim 1 wherein said ridge is continuous and uninterrupted throughout the circumferential extent of said wheel.

5. A chain power system of the type including a load chain comprised of successively joined, generally oval links, and an idler wheel over which said chain is trained for changing its direction, said wheel having a pair of adjacent peripheral grooves defining an outwardly convergent ridge therebetween with alternate links of the chain received in one groove and intervening alternate links received in the other groove, the improvement comprising,
said ridge being formed with an apical angle of from about 70° to about 80° to reduce cyclic loading on the chain due to passage thereof over the wheel.

References Cited

UNITED STATES PATENTS

| 1,395,330 | 11/1921 | Babbitt | 74—243 |
| 1,458,425 | 6/1923 | Lindquist | 74—230.5 |
| 2,632,334 | 3/1953 | Williams | 74—230.5 X |

FOREIGN PATENTS

| 770,953 | 7/1934 | France. |
| 878,767 | 10/1942 | France. |

MILTON KAUFMAN, *Primary Examiner.*

FRED C. MATTERN, *Examiner.*

J. A. WONG, *Assistant Examiner.*